United States Patent
Regier et al.

(10) Patent No.: US 8,133,100 B2
(45) Date of Patent: Mar. 13, 2012

(54) COMBINE HARVESTER PROCESSING SYSTEM HAVING ADJUSTABLE CONCAVES ON A SUSPENSION SYSTEM

(75) Inventors: Bernard D. Regier, Newton, KS (US); Robert A. Matousek, Milan, IL (US); Kelvin Eugene Bennett, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/642,155

(22) Filed: Dec. 18, 2009

(65) Prior Publication Data

US 2011/0151950 A1   Jun. 23, 2011

(51) Int. Cl.
A01F 12/28 (2006.01)
(52) U.S. Cl. ...................................... 460/109
(58) Field of Classification Search ............. 56/11.1, 56/11.2, 11.3, 10.2 A–10.2 J, 10.8, 14.6, 56/16.4, 16.8; 460/1–7, 46, 59, 62, 76, 79, 460/106, 109, 107, 116
See application file for complete search history.

(56) References Cited

U.S. PATENT DOCUMENTS

| | | | |
|---|---|---|---|
| 2,053,148 A | 9/1936 | James | |
| 2,577,329 A | 12/1951 | Irvine | |
| 2,794,438 A | 6/1957 | Heth | |
| 3,209,760 A | 10/1965 | Class | |
| 3,470,881 A | 10/1969 | Knapp et al. | |
| 3,574,129 A | 12/1970 | Hirsch | |
| 3,552,396 A * | 1/1971 | Gerhardt et al. | 460/1 |
| 3,631,862 A * | 1/1972 | Rowland-Hill et al. | 460/109 |
| 3,871,384 A | 3/1975 | Depaw et al. | |
| 3,974,837 A | 8/1976 | Applegate | |
| 4,004,404 A | 1/1977 | Rowland-Hill et al. | |
| 4,154,250 A | 5/1979 | Stuber | |
| 4,262,679 A | 4/1981 | James | |
| 4,330,000 A * | 5/1982 | Peiler | 460/109 |
| 4,375,221 A | 3/1983 | Bernhardt et al. | |
| 4,484,588 A | 11/1984 | Huhman et al. | |
| 4,672,981 A | 6/1987 | Huhman | |
| 4,706,690 A | 11/1987 | Huhman | |
| 4,711,075 A | 12/1987 | Strong | |
| 4,711,252 A | 12/1987 | Bernhardt et al. | |
| 4,774,968 A | 10/1988 | Spanlang | |
| 4,993,991 A * | 2/1991 | Yarmashev et al. | 460/66 |
| 5,743,795 A | 4/1998 | Kersting | |
| 6,290,599 B1 * | 9/2001 | Eis et al. | 460/62 |
| 6,325,713 B1 | 12/2001 | Haar et al. | |
| 6,358,142 B1 | 3/2002 | Imel et al. | |

(Continued)

FOREIGN PATENT DOCUMENTS

DE   69241 C   10/1892

(Continued)

OTHER PUBLICATIONS

International Search Report for International Application No. PCT/IB2010/003094 Dated May 16, 2011.

(Continued)

*Primary Examiner* — Robert Pezzuto (57) ABSTRACT

A combine harvester where opposing concaves on either side of a rotor of a processing system substantially simultaneously travel symmetrical paths. The concaves of the processing system may be supported on a suspension system such that the concaves are pivotally supported from a common axial location at one end and translationally adjusted at another end to move the concaves generally radially toward or away from the rotor.

27 Claims, 12 Drawing Sheets

U.S. PATENT DOCUMENTS

| | | | |
|---|---|---|---|
| 6,485,364 B1 * | 11/2002 | Gryspeerdt et al. | 460/107 |
| 6,485,365 B2 | 11/2002 | Imel et al. | |
| 6,503,142 B2 | 1/2003 | Imel et al. | |
| 6,530,833 B2 | 3/2003 | Imel et al. | |
| 6,758,745 B2 | 7/2004 | Van Der Haegen et al. | |
| 6,958,012 B2 | 10/2005 | Duquesne et al. | |
| 7,393,274 B2 | 7/2008 | Voss et al. | |
| 7,520,806 B2 * | 4/2009 | Bundy et al. | 460/6 |
| 7,857,690 B2 * | 12/2010 | Yanke et al. | 460/109 |
| 2002/0160822 A1 | 10/2002 | Imel et al. | |
| 2005/0009591 A1 | 1/2005 | Duquesne et al. | |
| 2005/0176483 A1 | 8/2005 | Schenk | |
| 2005/0176484 A1 | 8/2005 | Schenk | |

FOREIGN PATENT DOCUMENTS

| | | |
|---|---|---|
| DE | 4000909 A1 | 8/1990 |
| EP | 92599 A1 | 11/1983 |
| EP | 0516894 A1 | 12/1992 |
| GB | 2341074 A | 3/2000 |

OTHER PUBLICATIONS

Gleaner Parts Catalog Form No. 79017110, Jun. 1996 (selected pages, 4 pages).

\* cited by examiner

COMBINE HARVESTER PROCESSING SYSTEM HAVING ADJUSTABLE CONCAVES ON A SUSPENSION SYSTEM

TECHNICAL FIELD

This invention relates to the crop processing systems of combine harvesters.

CROSS-REFERENCE TO RELATED APPLICATIONS

The present U.S. application is related to U.S. application Ser. No. 12/642,186, filed Dec. 18, 2009 and entitled "CONCAVE ADJUSTMENT MECHANISM" (A1024H), which is incorporated herein by reference, and having been filed concurrently with the present application.

BACKGROUND

In one type of processing system the crop travels axially parallel to and helically around the rotational axis of one or more rotary processing devices commonly referred to as rotors. In other systems, during at least a portion of its travel through the system the crop travels in a transverse or tangential direction relative to the rotational axis of a rotary processing device commonly referred to as a threshing cylinder. In each case, grain is processed between elements affixed to the periphery of the rotary device and arcuate, usually foraminous, stationary processing members in the form of threshing concaves or separating grates that partially wrap around the lower portion of the device.

Because processing systems are utilized to harvest a wide variety of different crops and must function properly in many different operating conditions, it is important to be able to conveniently and accurately adjust the running clearance in the region between the rotary processing devices and stationary processing members to best accommodate these variables. However, it is also important to provide a way of suitably changing the cross-sectional shape of such regions as the running clearance is adjusted whereby to assure that proper processing action is obtained throughout the range of adjustment. While systems using axial flow have somewhat different specific requirements from system using transverse flow due to their different principles of operation, they can both benefit from an ability to appropriately adjust the cross-sectional shape of their processing regions as the running clearance is increased or decreased.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the rear of the harvester looking forwardly.

Figure 1:
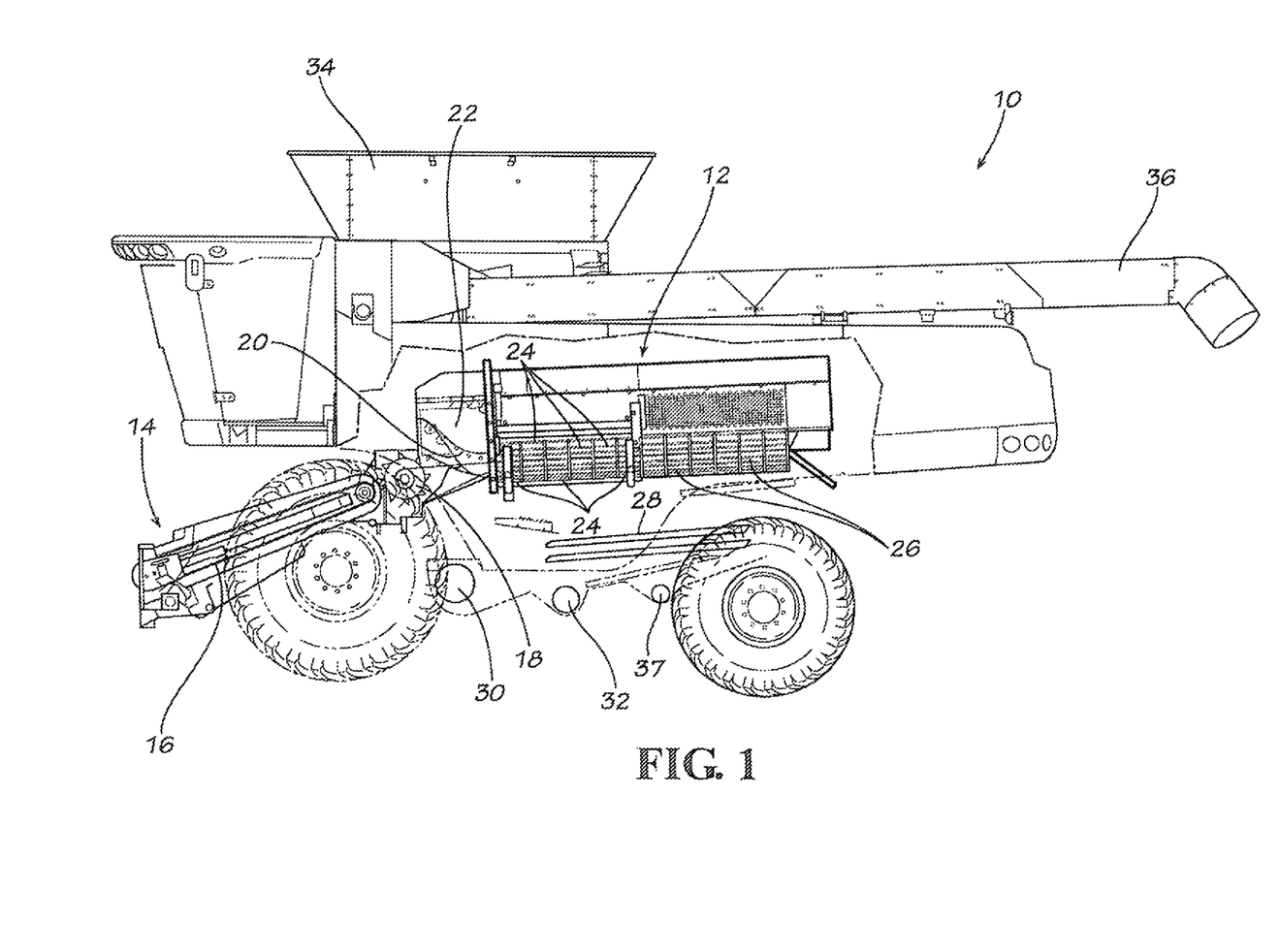
FIG. 1 is a schematic side elevational view of a combine harvester having a processing system utilizing axial flow and incorporating the principles of the present invention, portions of the harvester being broken away to reveal internal details of construction.

The exemplary combine harvester 10 selected for illustration in FIG. 1 has a single axial flow processing system 12 that extends generally parallel with the path of travel of the machine. However, as will be seen, the principles of the present invention are not limited to harvesters with processing systems designed for axial flow, nor to axial flow harvesters having only a single such processing system. However, for the sake of simplicity in explaining the principles of the present invention, this specification will proceed utilizing a single axial flow processing system as the primary example.

As well understood by those skilled in the art, in the illustrated embodiment combine harvester 10 includes a harvesting header (not shown) at the front of the machine that delivers collected crop materials to the front end of a feeder house 14. Such materials are moved upwardly and rearwardly within feeder house 14 by a conveyer 16 until reaching a beater 18 that rotates about a transverse axis. Beater 18 feeds the material upwardly and rearwardly to a rotary processing device, in this instance to a rotor 22 having an infeed auger 20 on the front end thereof. Auger 20, in turn, advances the materials axially into the processing system 12 for threshing and separating. In other types of systems, conveyor 16 may deliver the crop directly to a threshing cylinder.

Generally speaking, the crop materials entering processing system 12 move axially and helically therethrough during threshing and separating. During such travel the crop materials are threshed and separated by rotor 22 operating in cooperation with preferably foraminous processing members in the form of threshing concaves 24 and separator grate assemblies 26, with the grain escaping laterally through concaves 24 and grate assemblies 26 into cleaning mechanism 28. Bulkier stalk and leaf materials are retained by concaves 24 and grate assemblies 26 and are impelled out the rear of processing system 12 and ultimately out of the rear of the machine. A blower 30 forms part of the cleaning mechanism 28 and provides a stream of air throughout the cleaning region below processing system 12 and directed out the rear of the machine so as to carry lighter chaff particles away from the grain as it migrates downwardly toward the bottom of the machine to a clean grain auger 32. Auger 32 delivers the clean grain to an elevator (not shown) that elevates the grain to a storage bin 34 on top of the machine, from which it is ultimately unloaded via an unloading spout 36. A returns auger 37 at the bottom of the cleaning region is operable in cooperation with other mechanism (not shown) to reintroduce partially threshed crop materials into the front of processing system 12 for an additional pass through the system.

The combine includes a framework around the processing system 12 that preferably includes a front bulkhead and a center bulkhead where the concaves 24 are supported between the front and center bulkheads. The grates 26 are preferably supported between the center bulkhead and a rear bulkhead. As shown in FIG. 1 both the concaves 24 and grate assemblies 26 together concentrically receive the rotor 22 to serve as part of processing system 12. A pair of opposite facing, end-to-end concaves 24, which are the forwardmost concaves 24, are illustrated in FIGS. 7-10. However, it is preferable that the processing system 12 includes six pairs (total of twelve) substantially identical concaves 24 coupled within the combine 10 with one concave of each pair of concaves 24 positioned side-by-side along one side of the rotor 22 and the other concave of each pair of concaves 24 positioned side-by-side on the opposite side of the rotor 22. The concaves 24 are preferably of similar or substantially identical construction as described in greater detail below.

Figure 2:
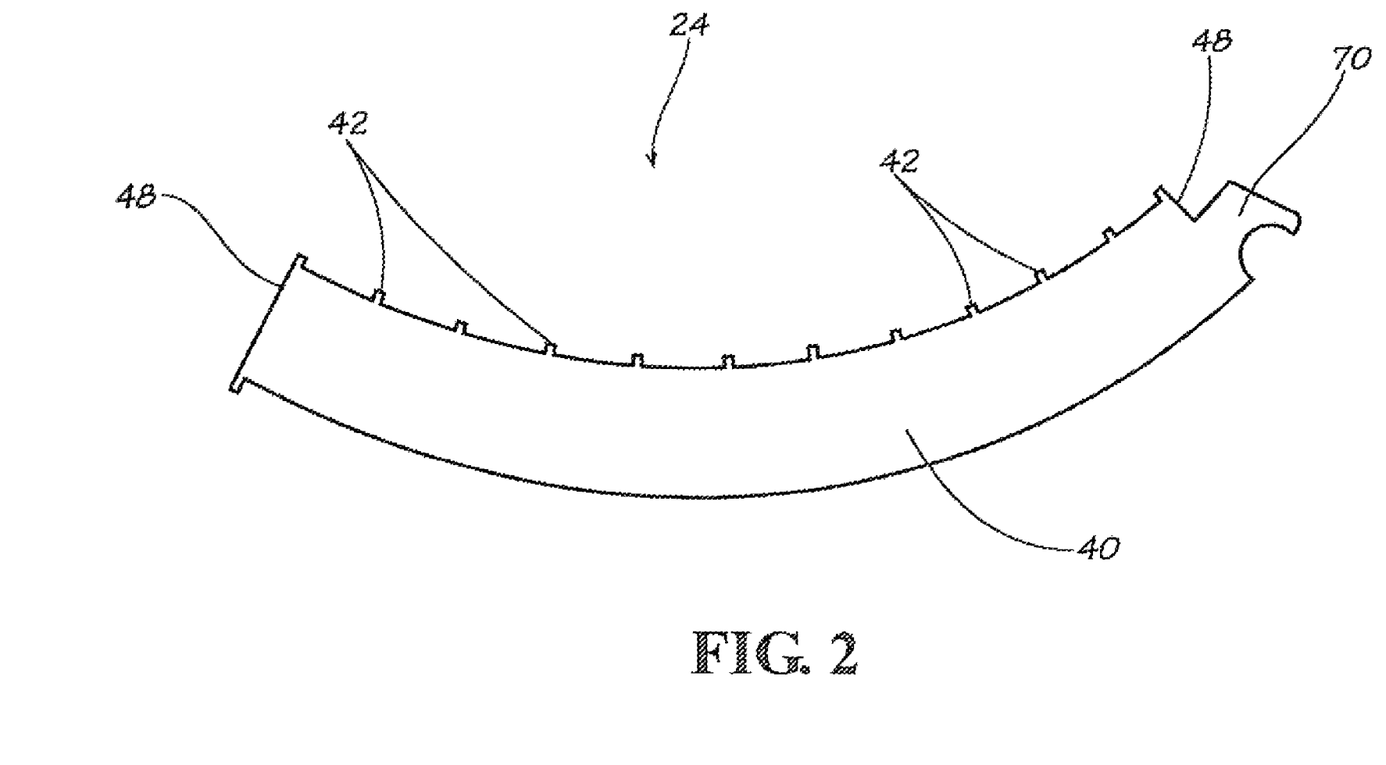
FIG. 2 is a side view of a concave of the processing system within the harvester of FIG. 1 according to one embodiment of the present invention.
Figure 3:
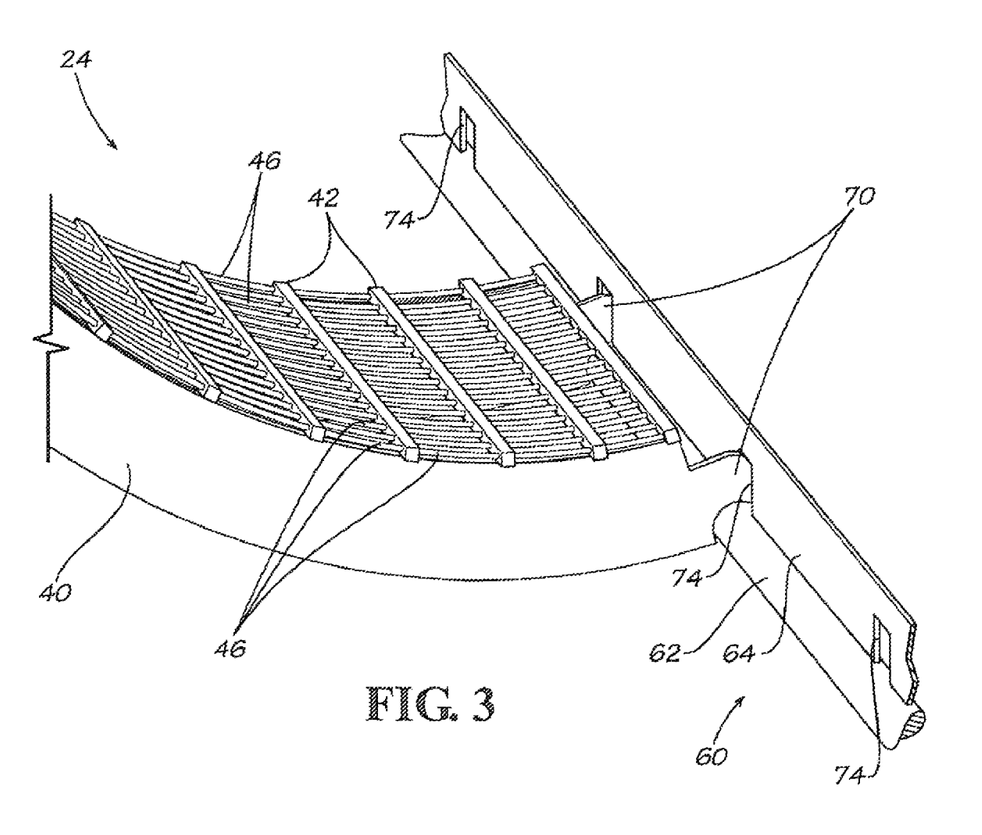
FIG. 3 is a left side isometric view of the concave of FIG. 2.
Figure 4:
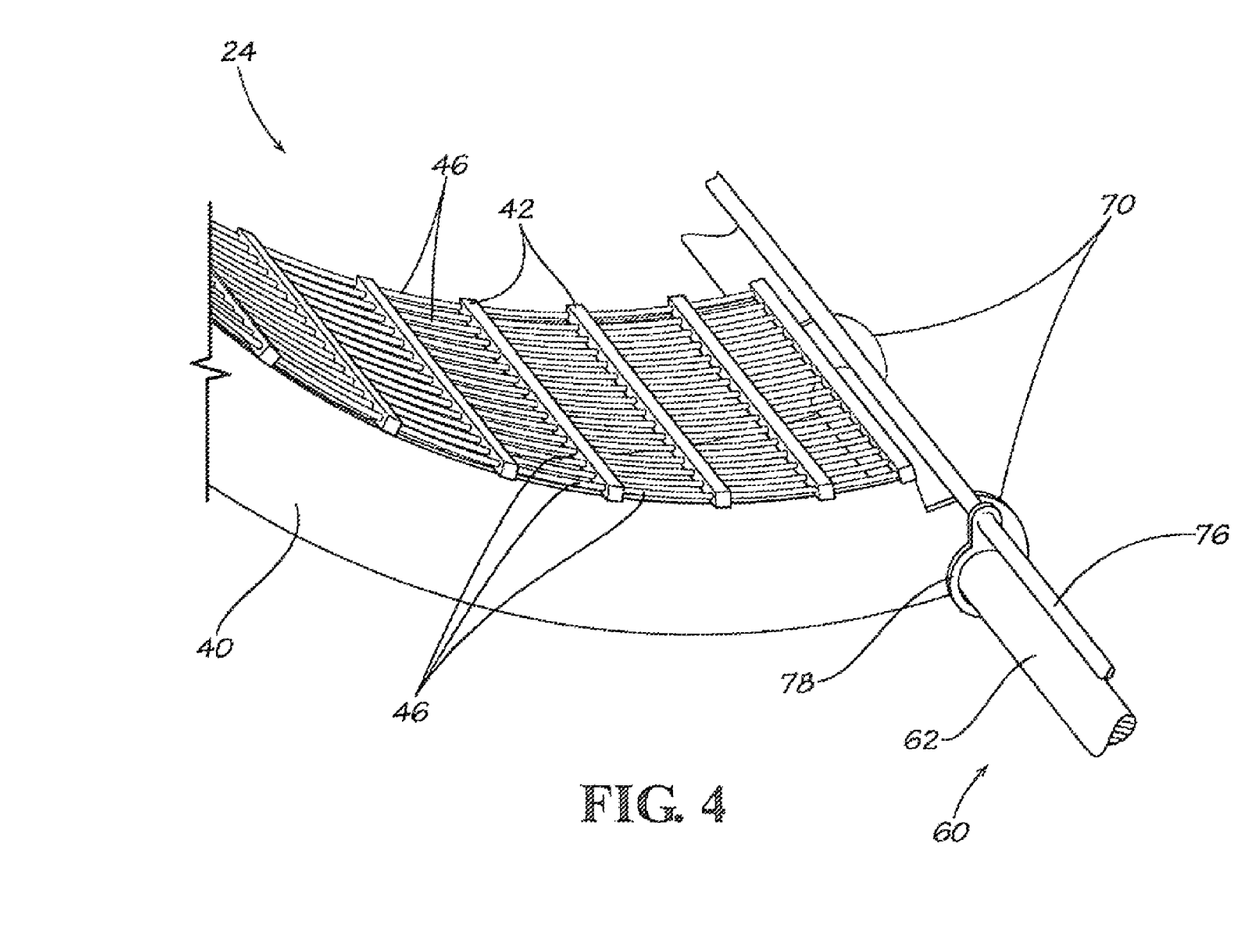
FIG. 4 is a left side isometric view of the concave of FIG. 2 according to an alternative embodiment.

One or more concaves 24 include a cradle-like frame having a pair of arcuate, elongated and laterally spaced apart side rails 40 as best shown in FIGS. 2-4. Each concave 24 includes a plurality of transverse bars 42 that span the side rails 40. The transverse bars 42 cooperate with a series of longitudinally extending, laterally spaced apart, curved rods 46 in defining apertures for the concave 24 through which grain may pass. The upper edges of transverse bars 42 project above the longitudinally extending curved rods 46 so as to provide a stepped threshing surface that cooperates with rasp-like elements on the rotating rotor 22 for threshing and separating the grain from cobs, husks, and other crop materials. The width of concave 24 is such that a plurality of concaves 24 can be installed side-by-side in the combine 10 and so that projecting overhangs at ends of one or more of the transverse bars 42 are operable to bear against each between adjacent concaves 24 are installed side-by-side in the combine. The overhangs of each transverse bar 42 also provide a continuous surface when the concaves 24 are installed side-by-side in the combine.

Figure 5:
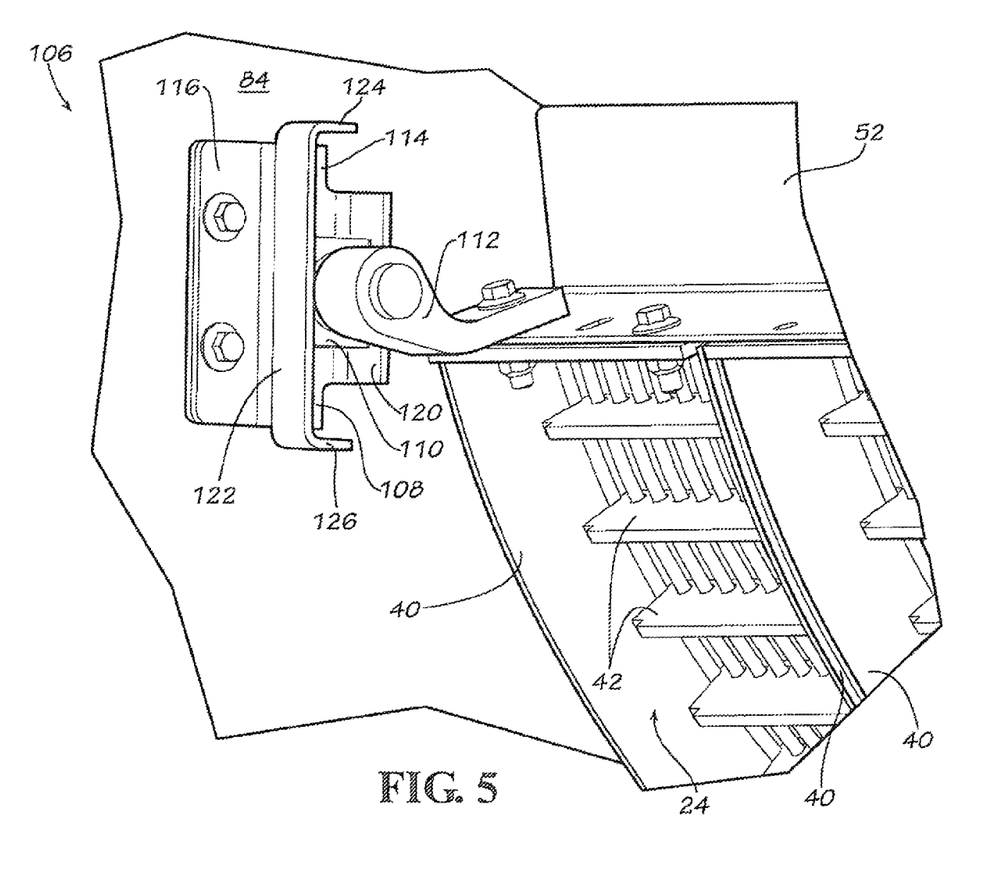
FIG. 5 is a left side isometric rear view of a guide assembly of a suspension system within the combine harvester of FIG. 1 according to one embodiment of the present invention.

In one or more embodiments, a pair of laterally spaced transverse ends walls 48 extend between the side rails 40 and are rigidly affixed thereto. In another embodiment, an endmost transverse bar 52 can act as an end wall. As best shown in FIG. 5, at an upper end of the concave 24, the end wall 48 includes one or more mounting holes to be aligned with mounting holes in an axially extending support member, such as angle member 52 so that the concave 24 can be securely mounted at its uppermost end with fasteners. Angle members 52, 54 define a portion of a vertical suspension system 50 for the concaves 24 which allows the concaves to move up and down relative the rotor 22.

Although the combine 10 may also include separator grate assemblies 26, none of the grate assemblies 26 are mounted for adjusting movement in a radial direction toward and away from rotor 22 in the particular illustrated embodiments, it is within the principles of the present invention to make grates 26 adjustable in the same manner as concaves 24. In the illustrated embodiments, each separator grate 26 is fixed to framework surrounding the rotor 22.

Each concave assembly 24 wraps around a portion of the bottom of rotor 22 in a circumferential direction and is adapted to move generally in a substantially symmetrical and concentric manner toward and away from rotor 22. A distal portion of each side rail 40 of each concave 24 extends outward beyond the endmost transverse bar 42 so that the lower end of each concave 24 may be received and carried by an axial extending common support assembly 60.

In one embodiment, the common support assembly 60 includes a common axial member such as a shaft or rockshaft 62 below the rotor 22 that extends along the centerline of the rotor 22. Preferably the rockshaft 62 is a machine shaft designed to rock back and forth. Coupled to the rockshaft 62 is a hold down member 64, such as a shaft or strap, which holds the distal ends of each side rail 40 of the concaves 24 while the distal ends rest on and are supported on the rockshaft 62.

Preferably, the distal ends of one or more side rails 40 includes hook-shaped lugs 70 so that the hook-shaped lugs 70 rest on top of the rockshaft 62. At least a portion of the shape of each lug 70 conforms to at least an upper portion of the circumference of the rockshaft 62. Preferably the inner diameter of the lug 70 substantially conforms to a portion of the outer diameter of the rockshaft 62. When the concaves 24 move toward or away from the rotor 22, the distal portions of the side rails 40 rotate about a portion of the circumference of rockshaft 62.

The hold down member 64 may be a flat strap rigidly attached along it's edge along a portion or all of the length of the rockshaft 62. The hold down member 64 may include slots 74 for receiving one or more of the distal portions of the side rails of the concaves 24. In another embodiment, as best shown in FIG. 4, the hold down member 64 may be another elongated shaft 76 so that the distal portions of the side rails 40 of the concaves may be received between the rockshaft 62 upon which the concaves 24 rest and the other elongated shaft 76 which acts to retain the distal ends of the side rails 40. In such case, both the rockshaft 62 and the elongated shaft 76 of the common support assembly 60 may be pivotally affixed to one another by spacing members such as tie straps 78 extending therebetween. In such case, the tie straps 78 are configured to define a first aperture sized for receiving the rockshaft 62 therethrough and define a second aperture sized for receiving the elongated shaft 76 therethrough. Preferably the elongated shaft 76 is fixed within the second aperture of each tie strap 78.

The concave assemblies 24 are moved adjustably toward and away from rotor 22 by operating mechanism broadly denoted by numeral 80. Operating mechanism 80 functions to substantially simultaneously adjust the pair of opposite facing concaves 24 relative to rotor 22 so as to adjust the running clearance between rotor 22 and concaves 24 and to change the shape of the threshing region. The primary component of operating mechanism 80 is an actuator 82 located near the left front of processing system 12 and preferably mounted on the forward bulkhead 84, but may be located elsewhere. Preferably, actuator 82 is remotely operable, such as from the cab of harvester 10. In one preferred embodiment, actuator 82 comprises an electrically powered linear actuator. However, that actuator 82 could comprise a number of different devices, such as a hydraulic cylinder or a turnbuckle, for example.

A control rod 88 of actuator 82 is connected pivotally at its end to a crank 90 that also forms a part of operating mechanism 80. The operating mechanism 80 also includes a crank 90 which is in turn fixed to other components of operating mechanism 80, including a fore-and-aft extending rockshaft 92 located alongside the processing system 12 and extending parallel to the axis of rotation of rotor 22. Rockshaft 92 is journaled at its ends for rotation within two bearing blocks 94 connected to the combine framework such as forward bulkhead 84 and a rearward bulkhead(not shown) generally positioned between the concaves 24 and the grate assemblies 26. However, the rockshaft 92 may be supported by any means possible which is suitable for allowing the rockshaft 92 to rotate as a result of movement initiated by the operating mechanism 80.

The suspension system 50 further includes one or more guide assemblies 106 which define a guide slot 108. Preferably there are two oppositely spaced guide assemblies 106 at the front of the processing system 12 affixed to the backside of the forward bulkhead 84 on opposite sides of the rotor 22. Another two oppositely spaced guide assemblies 106 are affixed to the front of the center bulkhead on opposite sides of the rotor 22. The guide slot 108 defined by each guide assembly 106 is configured to generally permit up and down sliding movement of the support members 52, 54. The guide slots 108 may receive and retain a stop 110 such as a plastic or rubber stop block on an arm 112 which are coupled to the angle members 52, 54 and cooperate with the guide assemblies 106 when received and retained in the guide slots 108 so that the range of up and down motion is limited. Alternatively, a bearing may be coupled to the angle members 52, 54 to be received and retained in the guide slots 108 while rolling in the guide slots 108.

Figure 6:
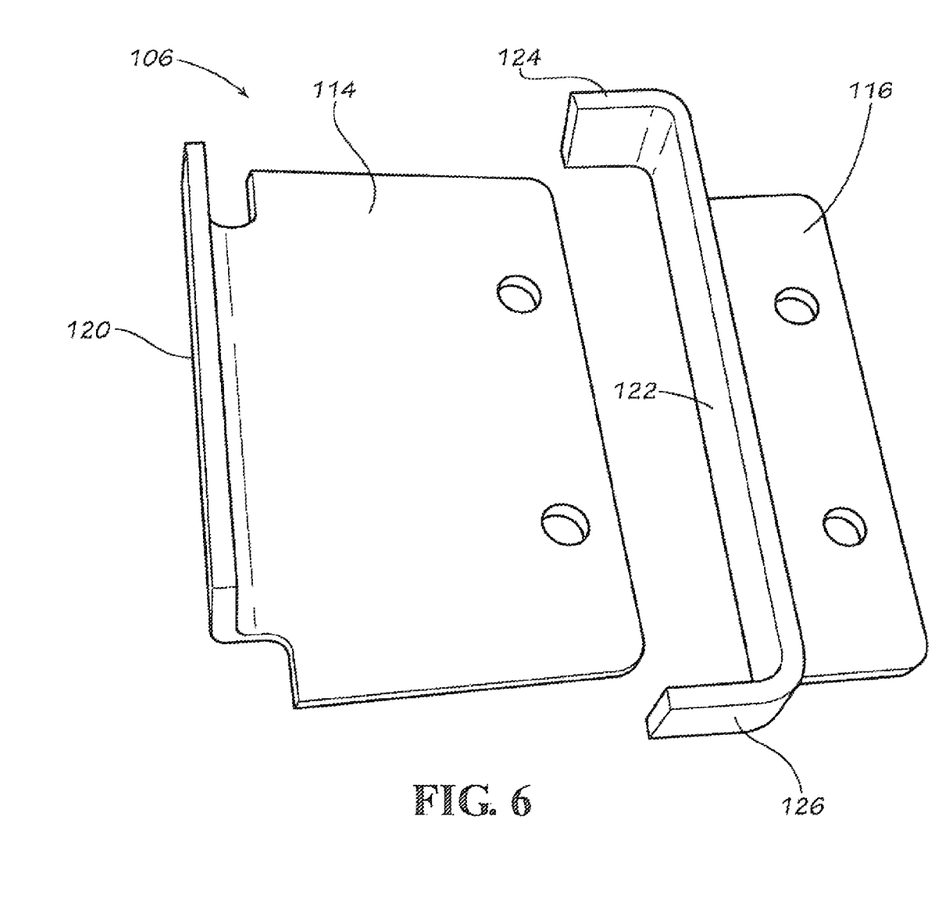
FIG. 6 is an exploded view of the guide assembly of FIG. 5 according to one embodiment of the present invention.

Preferably, as best shown in FIG. 6, the guide assemblies 106 have a first portion 114 and a second portion 116 that cooperate with one another when assembled together to define the guide slot 108. The first portion 114 includes an upturned portion 120 that defines one side of the guide slot 108 and the second portion 116 includes another upturned portion 122 that defines the opposite side of the guide slot 108. When the first portion 114 and second portion 116 are assembled together the second portion 116 overlaps the first portion 112 so that mounting holes in each portion are aligned to receive fasteners to affix the guide assemblies 106 to the respective bulkhead. In one embodiment, ends 124, 126 of the up turned portion 122 of the second portion 116 are turned inward to substantially become parallel to one another and define the upper and lower translational limits of the guide slot 108.

The suspension system 50 of one or more embodiments of the present invention further includes a one or more cross members 130 coupled to the common support assembly 60. Preferably a pair of transversely extending cross members 130 is positioned underneath the processing system 12 so that the rockshaft 62 can be supported thereon. Preferably, the rockshaft 62 is affixed to the cross members 130 so that the rockshaft 62 may be at least partially rotated when the concaves 24 are raised or lowered to any position.

The suspension system 50 of one or more embodiments of the present invention further includes one or more swing arms 134 pivotally mounted from the rockshaft 92. In one embodiment, a pair of swing arms 134 is suspended from the rockshaft 92 and extends to be pivotally coupled to two ends of the cross members 130. The opposite two ends of the cross members 130 are pivotally coupled to the frame of the combine 10 for movement about an axis parallel to the axis of the rotor 22.

Figure 7:
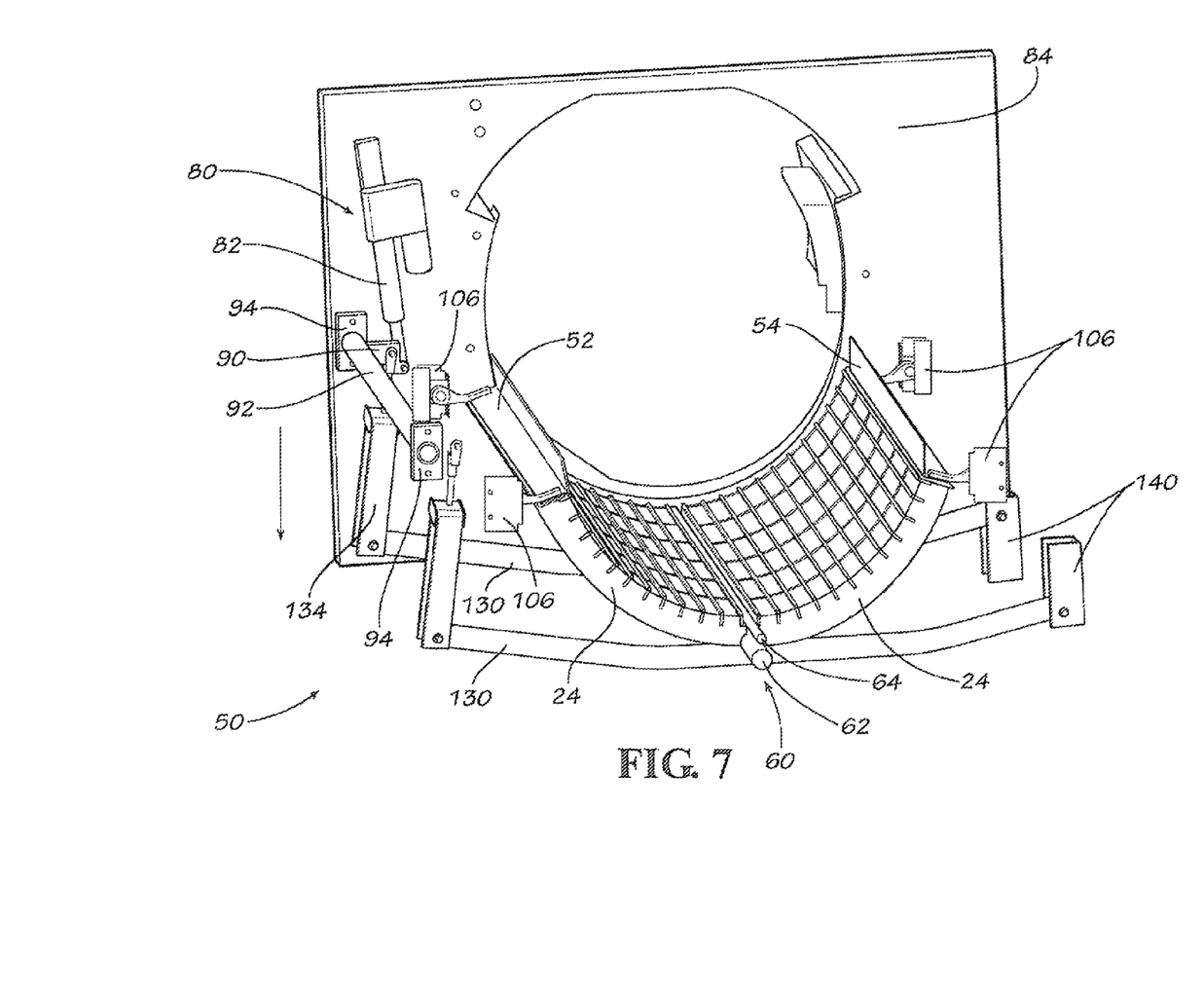
FIG. 7 is a left rear isometric view of the suspension system and processing system in an open position without the rotor according to one embodiment of the present invention.
Figure 8:
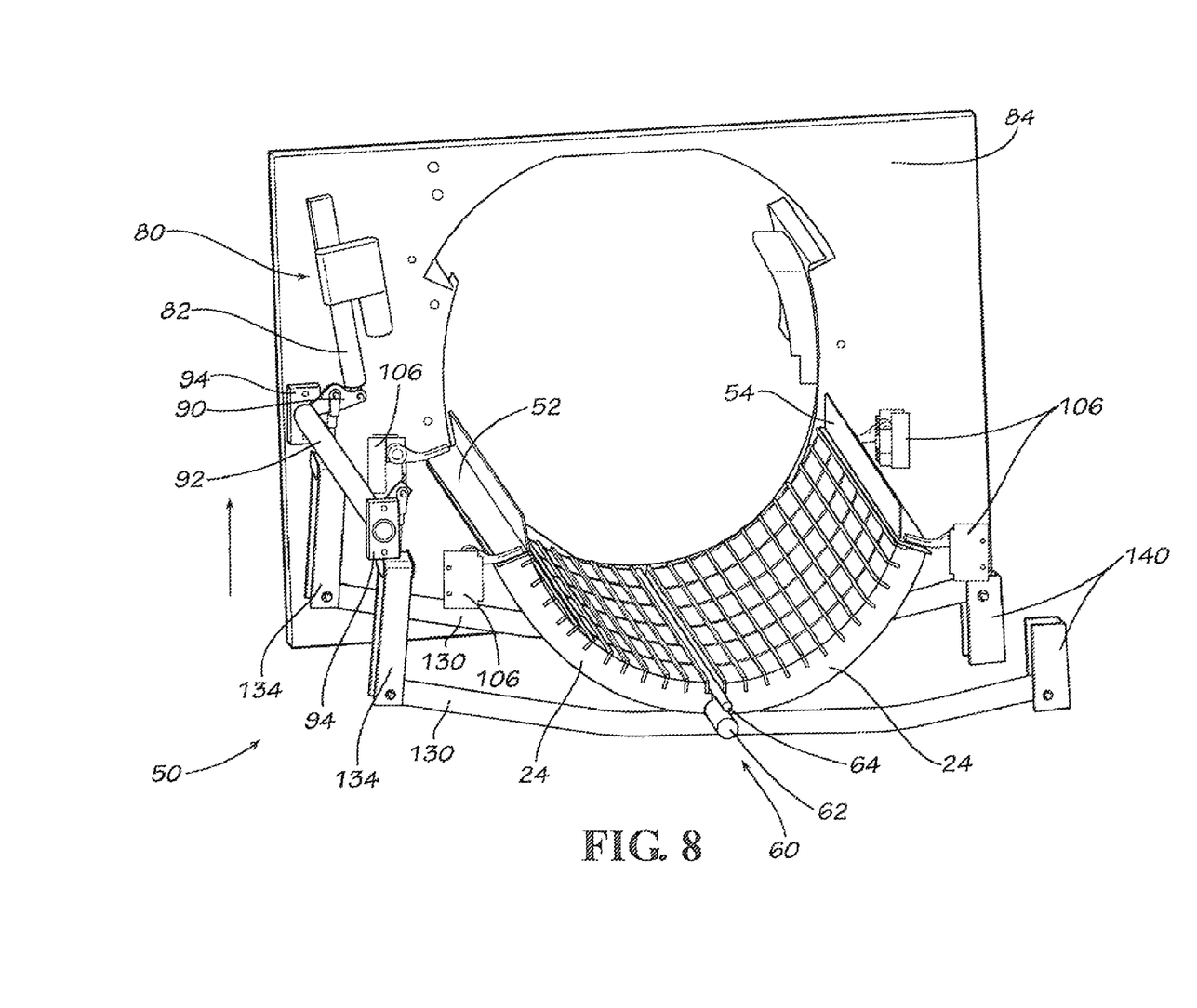
FIG. 8 is a left rear isometric view of the suspension system and processing system in the closed position without the rotor according to one embodiment of the present invention.

As best shown in FIGS. 7 and 8, two ends of the cross members 130 are pivotally connected to stationary pivot points 140.

Thus movement of the operating mechanism 80 causes the common support assembly 60 to move along a generally vertical direction. The lugs 70 of each concave 24 are pivotally mounted on the rockshaft 62 so that the suspension system 50 is operable to shift the concaves 24 along the vertical direction, toward or away from the rotor 22. The guide assemblies 106 and the suspension system 50 cooperatively maintain the concaves 24 in a substantially concentric relationship relative to the rotor 22 during movement of the suspension system 50. Consequently, when actuator 82 extends and retracts, such motion is imparted to rockshaft 92 which in turn simultaneously pivots concaves 24 upon the rockshaft 62 and slides the concaves in guide slots 108. The combination of the pivoting and sliding action causes the threshing region between rotor 22 and the pair of concaves 24 to be reshaped appropriately as the running clearance is adjusted.

The swing arms 134 of the suspension system 50 may also include a spring 150 that permits the concaves 24 to shift downward away from the rotor 22 if a foreign object or an excessive amount of crop flow is ingested by the processing system 12. Each end of the spring 150 is coupled between a lower and an upper end of the swing arm 134. Preferably the spring 150 is inside the swing arm 134 and an adjustable nut at the bottom of the spring 150 compresses the spring 150 to hold the swing arm 134 against an upper nut. When the large load or obstruction enters at the front of the processing system 12, the spring 150 of the forwardmost swing arm 135 compresses to extend the suspension system 50 to accommodate the large load or obstruction. Once the large load or obstruction passes the forwardmost swing arm 134, the ends of the swing arm 134 can retract to return the concaves 24 because the spring 150 is no longer compressed. As the large load or obstruction proceeds through the processing system 12 toward the rear of the combine 10, the spring 150 compresses to extend the rearward swing arm 134 to accommodate the large load or obstruction. Thus, the springs 150 of the forwardmost and rearmost swing arms 134 move the concaves 24 away from the rotor 22 as the large load or obstruction passes from the front to the rear of the processing system. Each spring 150 of the swing arms 134 may be adjusted independently based on where the large flow or obstruction is in the processing system 12. Thus, each pair of concaves 24 coupled to the angle members 52, 54 along the length of the processing system 12 is able to be adjusted to accommodate the large load or obstruction.

Figure 9:
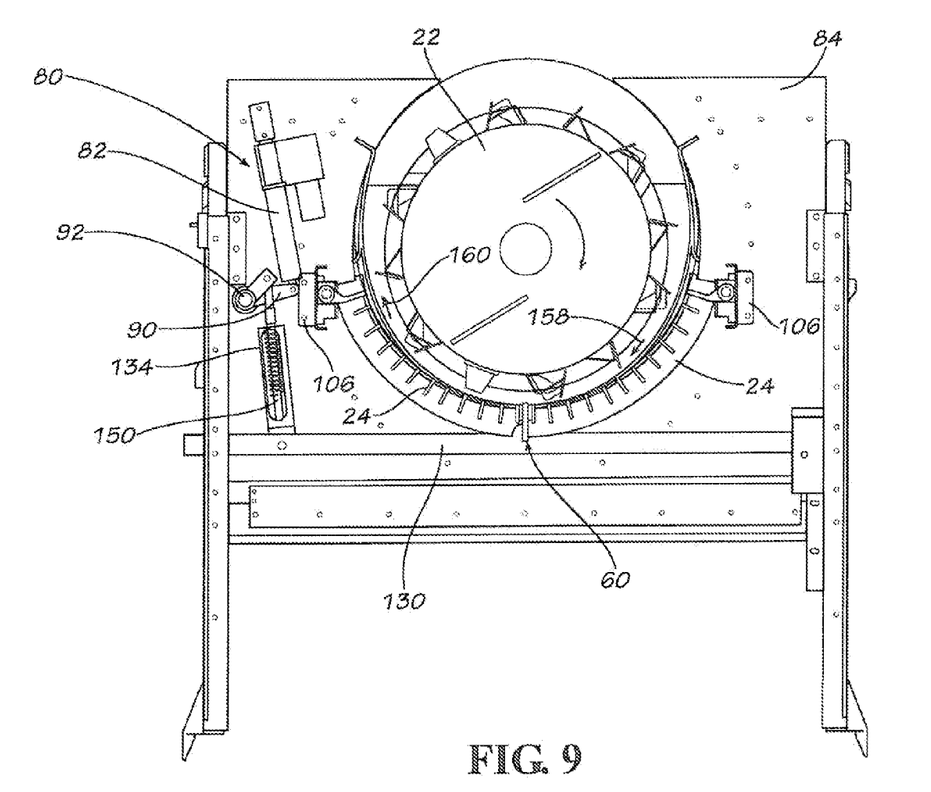
FIG. 9 is a rear elevational view of the processing system illustrating the threshing concaves in their fully closed position to minimize the running clearance between the rotor and the concaves.
Figure 10:
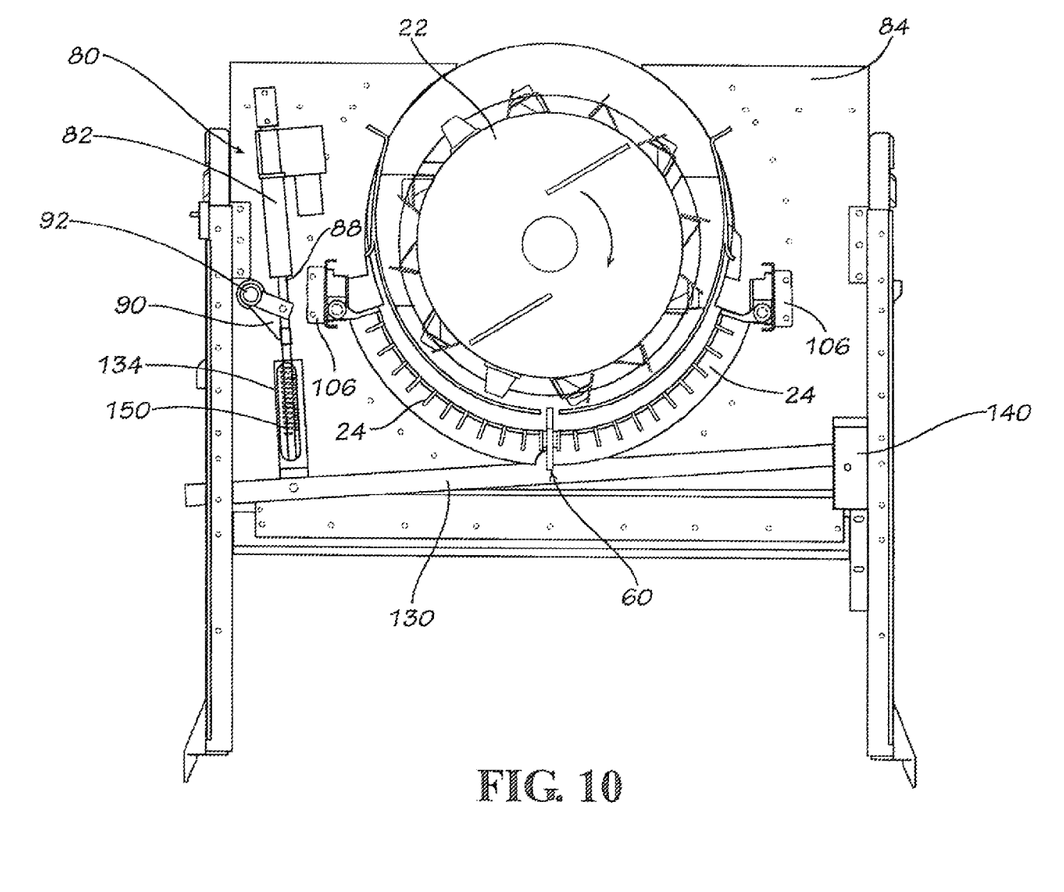
FIG. 10 is a rear elevational view of the processing system similar to FIG. 9 but illustrating the concaves in an open position maximizing the running clearance between the rotor and the concaves.

As illustrated in FIGS. 9 and 10, rotor 22 rotates in a clockwise direction as viewed from the rear of the combine 10. When viewed from the front, however, the crop materials are introduced into the front end of processing system 12 and they move helically within and about the rotor housing in a counter-clockwise direction. The threshing action occurs in a threshing region located generally in the bottom half of the processing system 12, between the periphery of rotor 22 and concave assemblies 24. When actuator 82 is retracted, the concaves 24 are simultaneously moved inwardly toward rotor 22 as best shown in FIG. 9. A converging, generally wedge-shaped inlet to the threshing region for crop materials coming around rotor 22 is denoted broadly by the numeral 158. The wedge-shaped inlet 158 tapers in the direction of rotation at one end of the threshing region.

An opposite, diverging, generally wedge-shaped outlet from the threshing region is denoted by the numeral 160. A gap at the top of the pair of concaves 24 is greater than the gap at the bottom of the pair of concaves 24 when the pair of concaves 24 are in the closed position relative the rotor 22 such that the wedge-shaped inlet 158 and the wedge-shaped outlet 160 are generally defined between the pair of concaves 24 and the rotor 22 when the pair of concaves are in the closed position.

In the illustrated embodiment, in the minimum clearance position of FIG. 9 the concaves 24 are concentric with rotor 22 over an arc of approximately sixty degrees on opposite sides of and symmetrical with the common support assembly 60. To increase threshing and separating aggressiveness, the area of concentricity could be extended significantly beyond sixty degrees such as, for example, when positioned for corn the angle is about one hundred forty-two degrees.

When actuator 82 is extended into an open position shown in FIG. 10, the concaves 24 are substantially simultaneously moved away from rotor 22. As the concaves 24 are adjusted toward an open position, the threshing region is simultaneously reshaped to thereby decrease the aggressiveness of the threshing action in that area. While the concaves 24 of each pair of concaves 24 are moved away from rotor 22 no more than approximately seventy-five percent of full open adjustment, the pair of concaves 24 and the rotor 22 remain substantially concentric and gaps between the pair of concaves 24 and the rotor 22 are substantially the same at the top of the pair of concaves 24 and at the bottom of the pair of concaves 24. In the event the rotor 22 needs to be unplugged, the operator may adjust the concaves 24 beyond seventy-five percent into a more fully open position so that the concaves 24 go beyond concentricity which allows the operator the ability to unplug the rotor 22. When moving the concaves 24 between fully open and fully closed positions, the concaves of the pair of concaves 24 travel a symmetrical path relative to one another.

Figure 11:
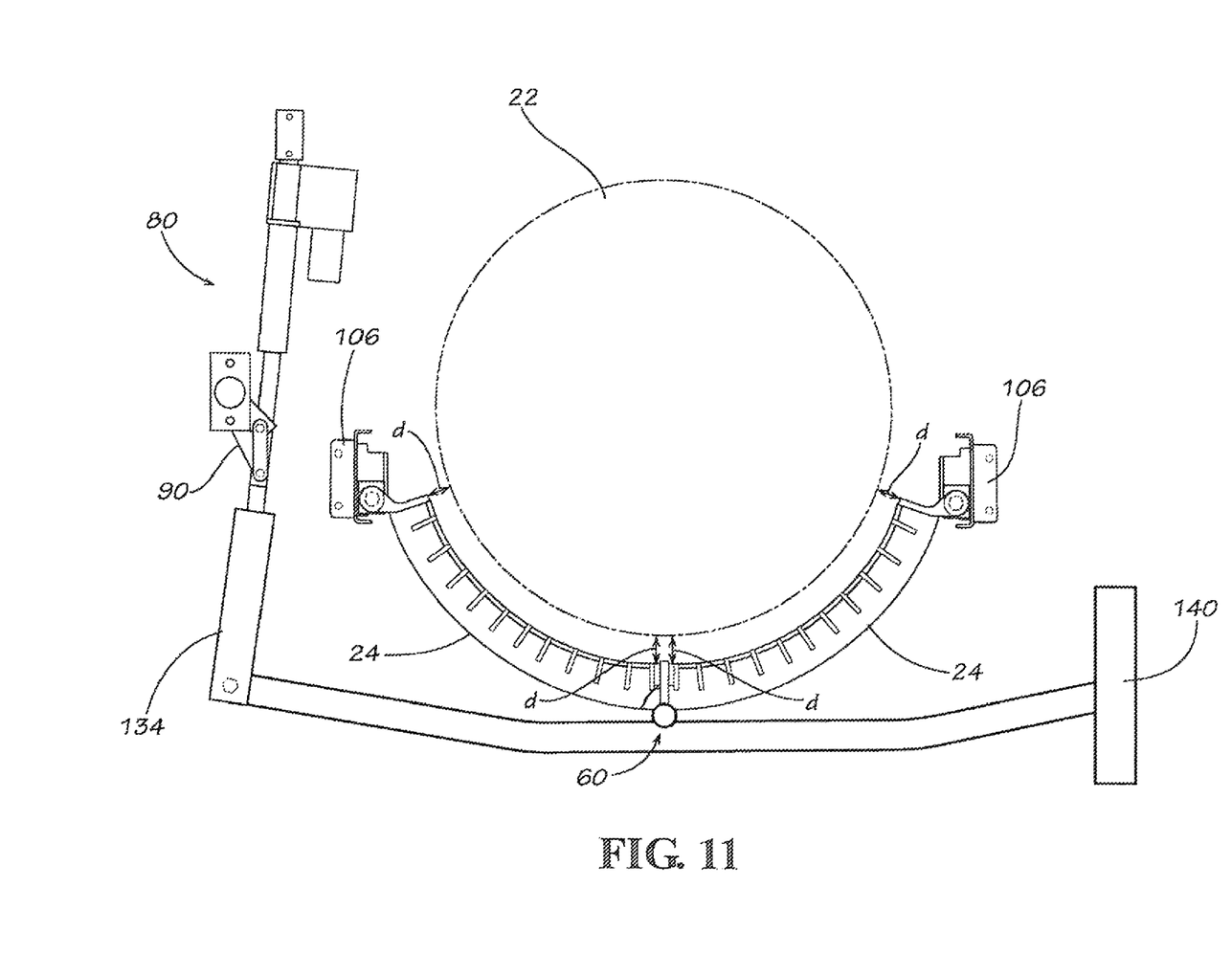
FIG. 11; is a rear elevational view of the processing system similar to FIG. 10 but illustrating substantially equal gaps of a distance d between the concaves and the rotor in an open position when the running clearance between the rotor and the concaves is optimal for processing crops.
Figure 12:
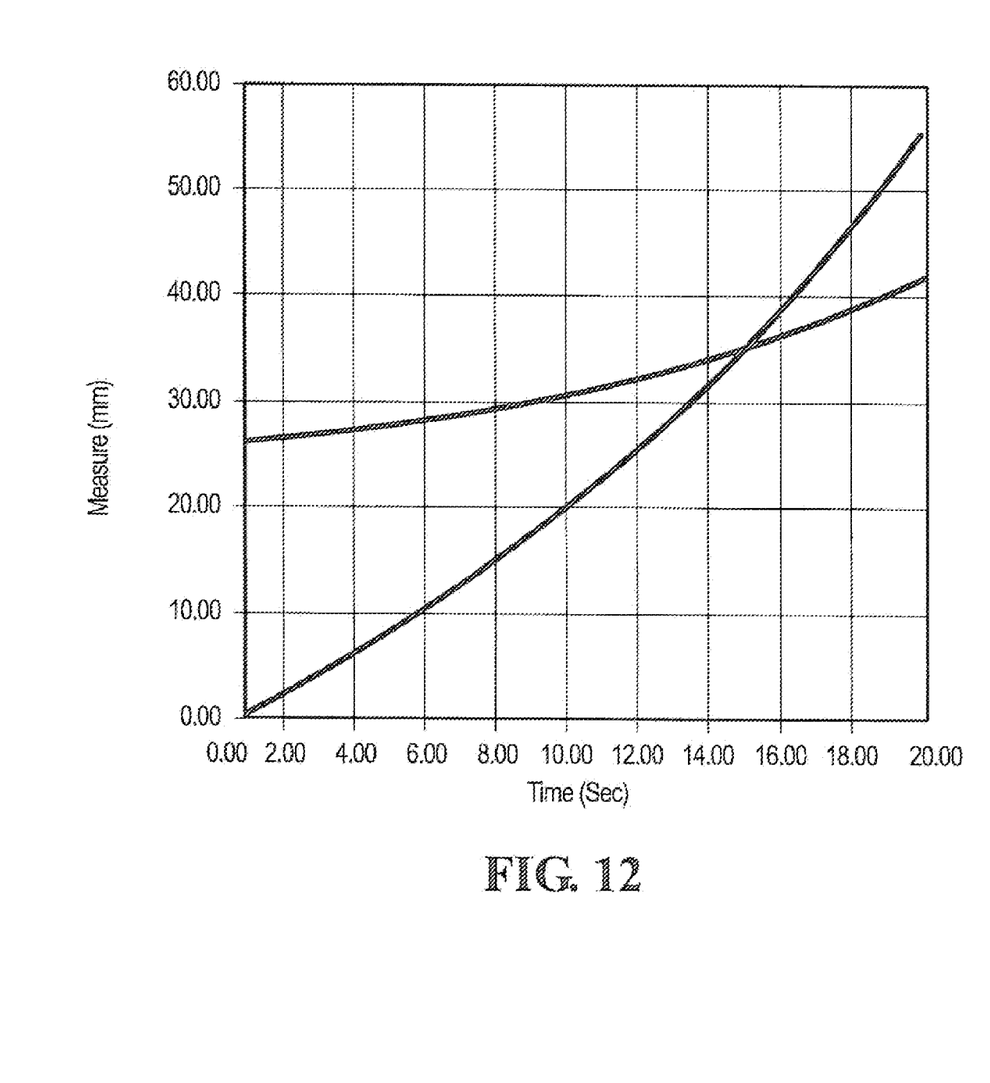
FIG. 12 is a graph illustrating the distance d of the gaps between the concaves and the rotor as the concaves move over time.

FIG. 11 is a rear elevational view of the processing system 12 similar to FIG. 10. FIG. 11 illustrates substantially equal gaps of a distance d between the concaves 24 and the rotor 22 is in an open position when the running clearance between the rotor 22 and the concaves 24 is optimal for crop processing. The top right and left distances, as well as the bottom right and left distance are all approximately the same distance d. FIG. 12 is a graph illustrating the distance d of the gaps between the concaves 24 and the rotor 22 as the concaves 24 move over time from a closed position into an open position. When the concaves 24 are in the fully closed position, as about zero seconds, the bottom right and left distances (represented by the lower line) approach approximately zero whereas the top right and left distances (represented by the upper line) are approximately between 20 and 30 millimeters. The graph of FIG. 12 also illustrates that the distances between the top right and left as well as the bottom right and left converge over time. Between approximately 30 and 40 millimeters the distance between the top right and left as well as the bottom right and left should be measured at about the same distance d as the concaves approach an open position, of approximately seventy-five percent of fully open, for optimally operating the processing system 12 for processing crops. In the example, the concaves 24 took approximately 15 seconds to reach the optimal open position with a distance d of approximately 35 mm between the top right and left as well as the bottom right and left.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A combine harvester having a crop processing rotor, comprising:
    a pair of opposite facing concaves extending at least partially beneath the rotor in a circumferential manner and moveable in a generally symmetrical and concentric manner therefrom, each concave of said pair of concaves has side rails having distal ends defining circumferentially extending hook-shaped lugs; and
    a suspension assembly for supporting said pair of concaves and for substantially simultaneously adjusting the operating clearance between each concave of said pair of concaves and the rotor, said suspension assembly comprising a common axial shaft and a hold down member cooperating with one another to detachably retain said concaves on said common axial shaft when resting on said common axial shaft, wherein said hook-shaped lugs are received on said common axial shaft to provide pivoting movement of said concaves about said common axial shaft.

2. The combine harvester of claim 1 wherein said pair of concaves are pivotally coupled at a common axial location on said suspension system.

3. The combine harvester of claim 2 wherein said pair of concaves are detachably and pivotally coupled at said common axial location on said suspension system.

4. The combine harvester of claim 1 wherein each concave of said pair of concaves travels substantially symmetrical paths relative the rotor when the operating clearance is adjusted.

5. The combine harvester of claim 1 wherein said pair of concaves are translationally coupled at separate laterally spaced locations on said suspension system.

6. The combine harvester of claim 5 wherein said pair of concaves are slidably coupled at said laterally spaced locations.

7. The combine harvester of claim 1 wherein said pair of concaves are both pivotally coupled at a common axial location and translationally coupled at separate laterally spaced locations for generally radial movement relative to the rotor.

8. The combine harvester of claim 7 wherein radial movement at ends of each concave of said pair of concaves is equidistant relative the rotor when adjusting the operating clearance.

9. The combine harvester of claim 1 wherein each concave of said pair of concaves is substantially identical.

10. The combine harvester of claim 1 wherein either concave of said pair of concaves may be utilized on either side of the rotor.

11. The combine harvester of claim 1 wherein said pair of concaves may be utilized in a side-by-side manner on either side of the rotor.

12. The combine harvester of claim 1 wherein said concaves of a plurality of pairs of concaves are arranged in both a longitudinal direction and in a transverse direction.

13. The combine harvester of claim 12 wherein one of any of said concaves may be removed and exchanged with any other of said concaves in said combine.

14. The combine harvester of claim 1 further comprising a pair of transversely oriented and axially spaced cross members for tangentially supporting said common axial shaft supporting said pair of concaves, said pair of cross members coupled to said combine for pivoting movement about an axis substantially parallel to an axis of the rotor and said pair of cross members coupled to a rockshaft such that rotational movement of said rockshaft causes said common axial shaft to move in a generally vertical direction to move said pair of concaves toward or away from the rotor.

15. The combine harvester of claim 1 wherein said suspension system further comprises a guide assembly having a first portion and a second portion cooperating with one another to define a guide slot to permit translational movement of said pair of concaves.

16. The combine harvester of claim 1 wherein gaps between said pair of concaves and the rotor are substantially the same at a top end of said pair of concaves and at a bottom end of said pair of concaves when said pair of concaves are in an open position relative the rotor, and wherein said gap at said top end of said pair of concaves is greater than said gap at said bottom end of said pair of concaves when said pair of concaves are in a closed position relative the rotor such that a wedge shaped inlet and a wedge shaped outlet are generally defined between said pair of concaves and the rotor when said pair of concaves are in said closed position.

17. A combine harvester having a crop processing rotor, comprising:
a pair of opposite facing concaves extending at least partially beneath the rotor in a circumferential manner and moveable in a generally symmetrical and concentric manner therefrom;
a suspension assembly for supporting said pair of concaves and for substantially simultaneously adjusting the operating clearance between each concave of said pair of concaves and the rotor, said suspension assembly comprising a common axial shaft supporting said pair of concaves and a pair of transversely oriented and axially spaced cross members for tangentially supporting said common axial shaft, said pair of cross members coupled to said combine for pivoting movement about an axis substantially parallel to an axis of the rotor, said pair of cross members being coupled to a rockshaft such that rotational movement of said rockshaft causes said common axial shaft to move in a generally vertical direction to move said pair of concaves toward or away from the rotor;
a plurality of guide assemblies, each of said guide assemblies having a first portion and a second portion cooperating with one another to define a guide slot; and
a pair of axially extending support members alongside the rotor, said support members interacting with said guide slots for detachably affixing said pair of concaves in spaced proximity to the rotor, said slots of said guide assemblies permitting only up and down sliding movement of said support members to permit translational movement of said pair of concaves.

18. The combine harvester of claim 17 wherein said suspension assembly comprises a common axial shaft and a hold down member cooperating with one another to detachably retain said concaves on said common axial shaft when resting on said common axial shaft.

19. The combine harvester of claim 18 wherein each said concave of said pair of concaves comprises side rails having distal ends defining a circumferentially extending hook-shaped lug received on said common axial shaft to provide pivoting movement of said concaves about said common axial shaft.

20. The combine harvester of claim 17 wherein each said first portion includes an upturned portion and each said second portion includes an upturned portion, both said upturned portions at least partial opposing one another to define said guide slot when said first and second portions at least partially overlap one another.

21. A method for a combine harvester having rotor, said method comprising the steps of:
mounting a plurality of concaves on a common axial shaft by hooking hooked-shaped lugs on distal ends of side rails of said concaves over said axial shaft and detachably retaining said concaves on said common axial shaft with a hold down member;
rotating the rotor over said plurality of concaves at least partially positioned underneath the rotor;
moving said plurality of concaves toward or away from the rotor such that said plurality of concaves simultaneously travel symmetrical paths relative to one another;
removing one of said plurality of concaves from a first position; and
replacing said one concave with another of said plurality of concaves from a second position.

22. The method of claim 21 further comprising the step of each said concave substantially traveling symmetrical paths relative to one another when said concaves move toward and away from the rotor when the operating clearance is adjusted.

23. The method of claim 22 further comprising the steps of rocking a rockshaft back and forth to impart movement of said concaves toward and away from the rotor, and as a result of said rocking step, said concaves pivoting about a portion of a circumference of said rockshaft.

24. The method of claim 21 further comprising the step of replacing said other concave with said one concave in said second position.

25. The method of claim 21 wherein said removing and replacing steps comprise moving said one concave from one side of the rotor and replacing said one concave with said other concave from the other side of the rotor.

26. The method of claim 21 wherein said removing and replacing steps comprise moving said one concave from one side of the rotor and replacing said one concave with said other concave from said one side of the rotor.

27. The method of claim 21 wherein said removing and replacing steps comprise moving said one concave from either side of the rotor and replacing said one concave from either side of the rotor.

* * * * *